United States Patent Office 3,339,682
Patented Sept. 5, 1967

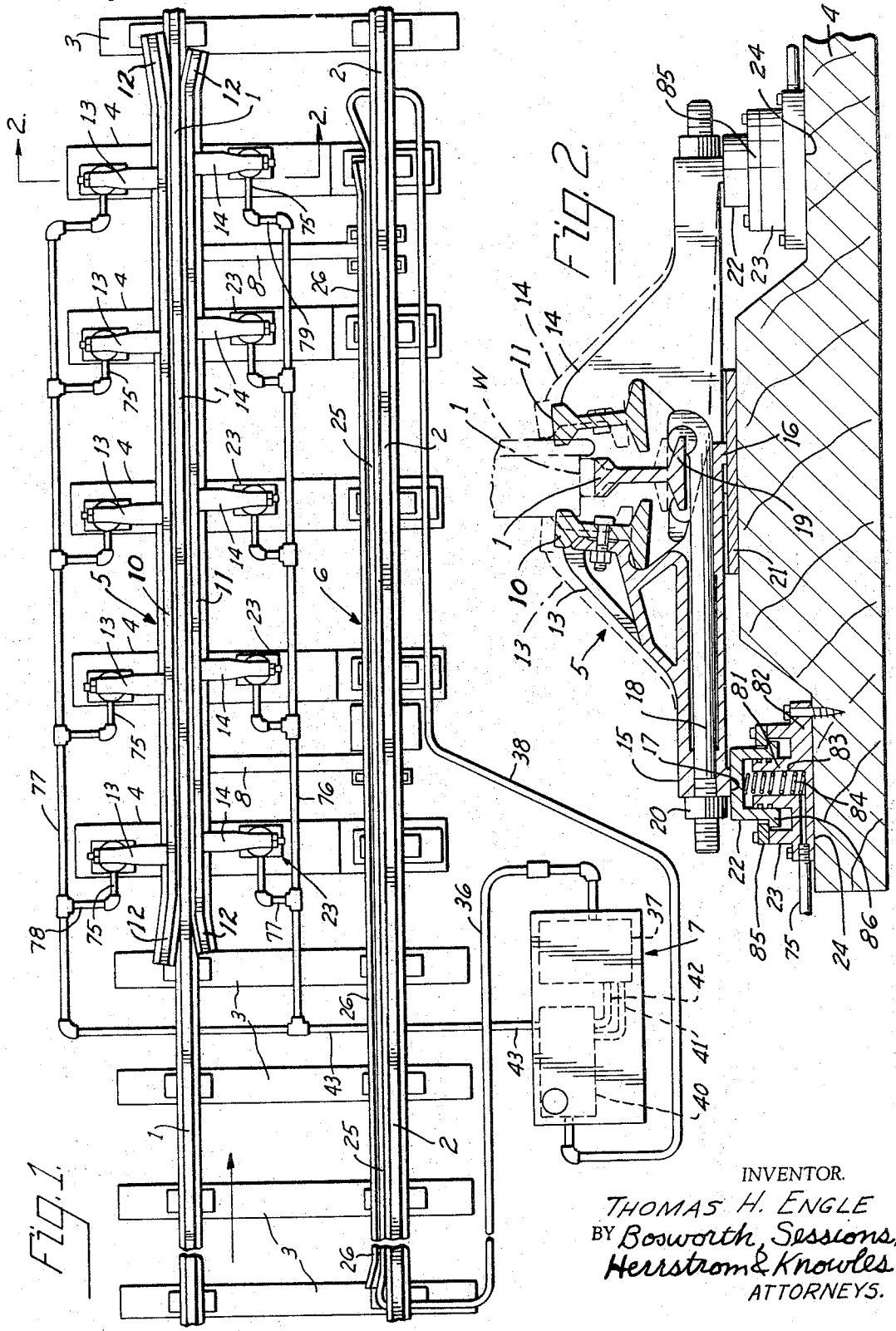

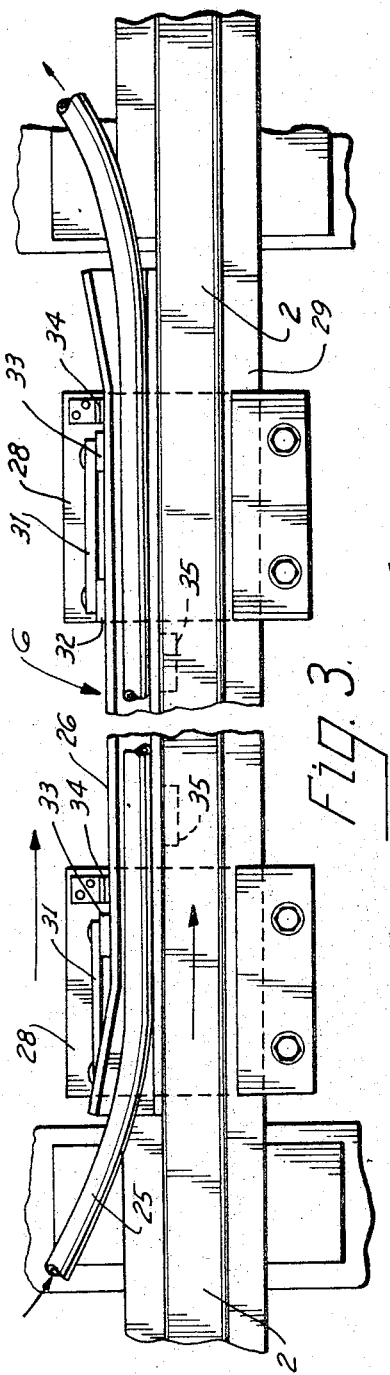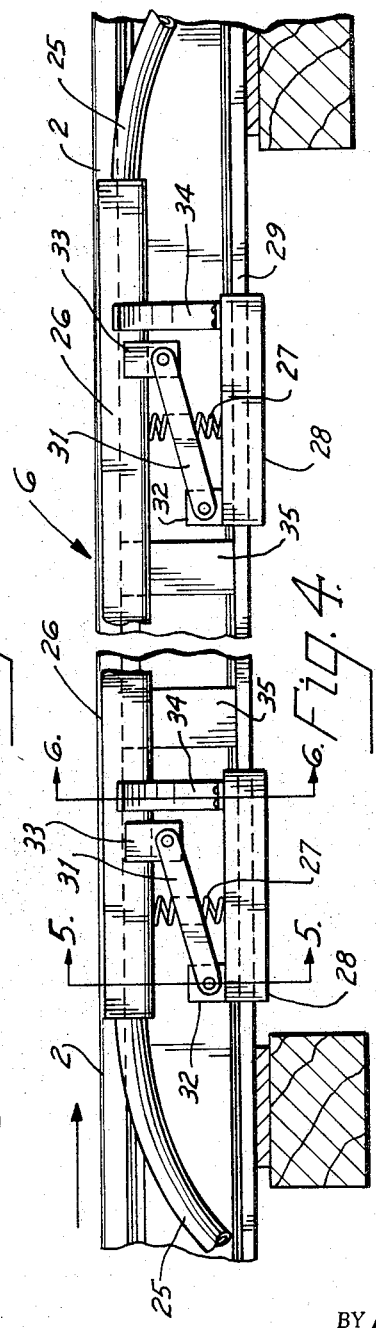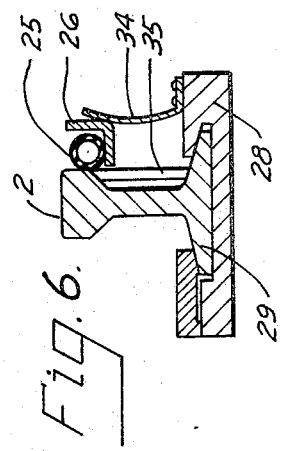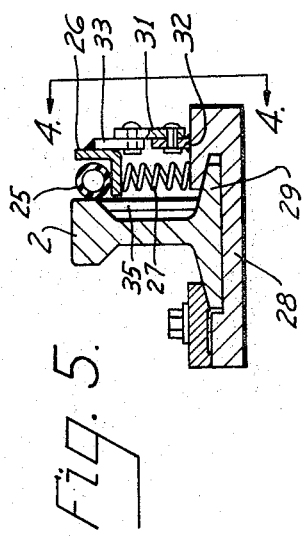

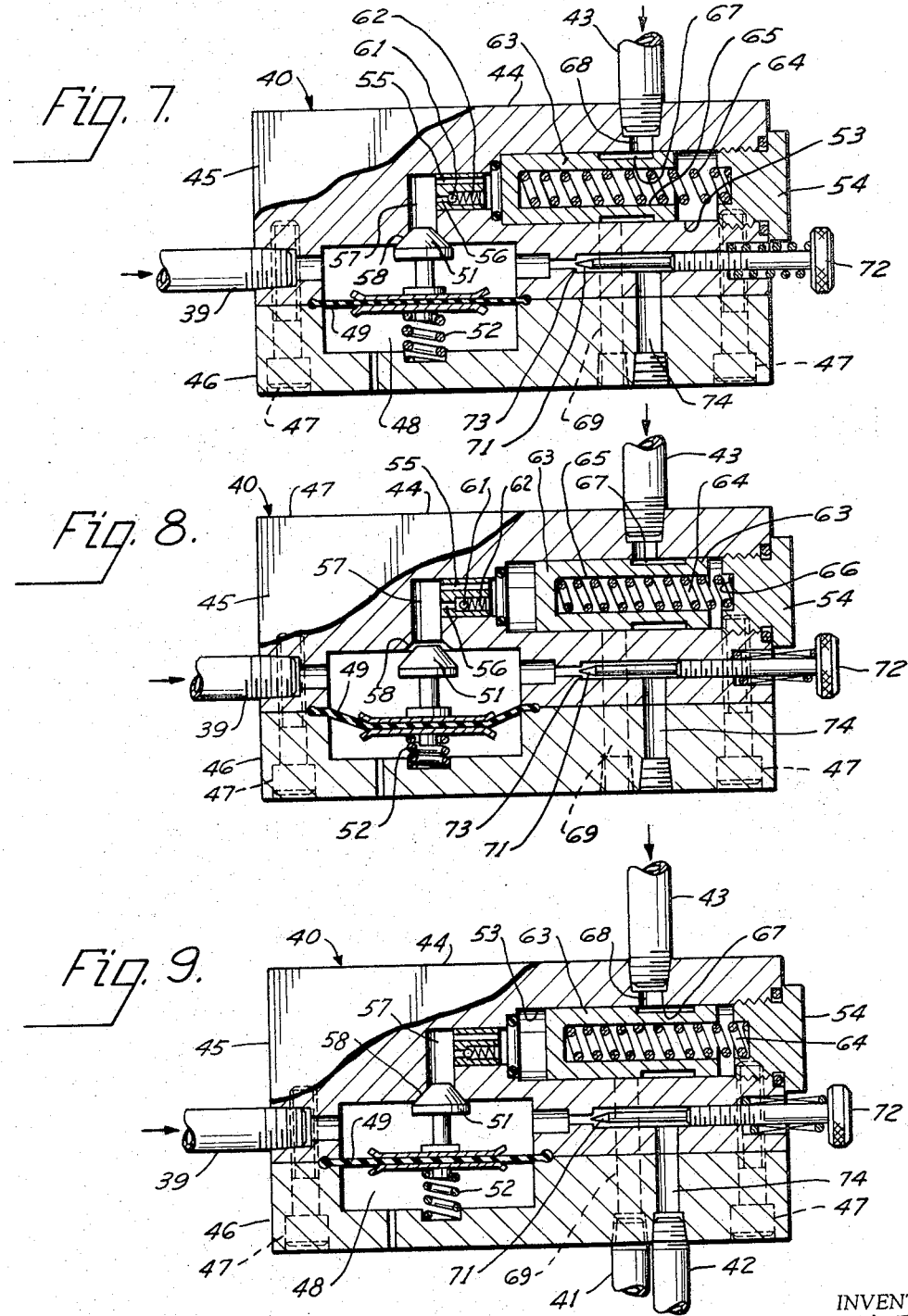

3,339,682
CAR RETARDER
Thomas H. Engle, 488 E. 129th St.,
Cleveland, Ohio 44108
Filed Apr. 14, 1964, Ser. No. 366,938
13 Claims. (Cl. 188—180)

This invention relates to car retarders, and more particularly to speed sensitive, weight proportional car retarders.

Inert car retarders of the weight proportional type, in which the braking force exerted on the wheels of a railway car is essentially proportional to the weight of the car, are widely used. However, since this type of weight proportional car retarder exerts the same braking force on a car of given weight, regardless of its speed, a slow moving car will be stopped and not released if it has insufficient inertia to travel through the car retarder against the resistance caused by the braking force. This characteristic is undesirable in car retarders which are not intended to halt the cars but control their speed so that they can be released from the retarder at a speed not exceeding a maximum speed.

Car retarders have been proposed which operate in accordance with the weight of the car and the speed of the car, but in general such prior car retarders require expensive and complicated control systems and often are not as satisfactory in operation as desirable.

An object of the present invention is to provide a speed sensitive, weight proportional car retarder. Another object is the provision of a car retarder in which the braking force acting on the retarded car wheels is proportional to the weight of the car, but is applied to the wheel only so long as the car is traveling above a predetermined speed. Another object is the provision of such car retarder in which the braking force is not applied if the car is traveling below the predetermined speed. A further object is the provision of a car retarder which will become operative if the car is traveling over the predetermined speed, which will then exert on the car a braking force proportional to the weight of the car, and which will then release the braking force after the car has been slowed to below the predetermined speed. Another object is the provision of such a car retarder which is simple and rugged in construction and simple in operation.

These and other objects of the invention will become apparent from the following description of a preferred embodiment of the invention in connection with the following drawings in which:

FIGURE 1 is a plan view of a railroad track incorporating a car retarder embodying the invention;

FIGURE 2 is a section along line 2—2 of FIGURE 1;

FIGURE 3 is a plan elevation of the speed sensing mechanism of the illustrated car retarder;

FIGURE 4 is a side elevation thereof, viewed from line 4—4 of FIGURE 5;

FIGURE 5 is a section along line 5—5 of FIGURE 4;

FIGURE 6 is a section along line 6—6 of FIGURE 4;

FIGURE 7 is a section through valve mechanism operated by the speed sensing invention for controlling the application of braking force by the car retarder of the illustrated embodiment, the control valve mechanism being shown in the position the parts assume when the braking force is applied;

FIGURE 8 is a view, partly in section, of the same mechanism after it has responded to a car moving through the retarder at a speed above predetermined speed above which the retarder operates; and FIGURE 9 is a view of the same mechanism, partly in section, of the parts after a car has left the retarder at a speed above the predetermined speed.

The railroad track of FIGURES 1 and 2 comprises two running rails 1 and 2, which outside the retarder are conventionally fixed to and supported by conventional wood ties 3 and inside the retarder are supported from special cross ties 4. Cross ties 3 and 4 are suitably anchored, as by being set in ballast in the ground. Rail 1 has associated with it a retarder braking mechanism indicated by numeral 5, while the other rail 2 has associated with it a speed sensing mechanism indicated by numeral 6. The speed sensing mechanism 6 is connected to the braking mechanism 5 through control means designated by numeral 7 that operates the braking mechanism 5 if the car speed sensed by the sensing means is higher than a predetermined speed, hereinafter called the "actuating speed." Rails 1 and 2 are connected together by conventional stabilizer means 8 for purposes later indicated.

The braking mechanism comprises brakeshoe rails 10 and 11 positioned on opposite sides of running rail 1. These rails 10 and 11 with their upper portions above rail 1. These rails 10 and 11 have outwardly flared ends 12 to facilitate wheel entry. Rail 10 is rigidly fixed to lever members 13 and rail 11 is rigidly fixed to lever members 14. Corresponding members 13 and 14 are mounted on the ties 4 in offset relation as shown in FIGURE 1. Members 13 and 14 are identical; each comprises a lower portion 15 with a downwardly protruding hardened bearing portion 16 at its inner end under running rail 1 and a downwardly projecting hardened bearing portion 17 at its outer end. A hook bolt 18 extends through the lower portion 15 of each member 13 and 14. The inner end of each hook bolt passes under and hooks over the edge of lower flange 19 of the running rail 1 opposite the side of the rail from which extends the lever member carrying the hook bolt; and the outer end of the hook bolt carries a nut 20 bearing against the outer end of the lever member to clamp it on the rail 1. The bearing portions 16 of opposed lever members 13 and 14 bear on a plate 21 fixed to the central portion of tie 4. Bearing portion 17 of each lever member bears on an individual piston 22 of a cylinder unit 23, to be later described, fixed to one of the end portions 24 of tie 4, which are lower than the central portion of the tie to provide room for the cylinder units.

The full lines in FIGURE 2 show the above parts of the braking mechanism when pistons 22 are in their raised positions and no car wheel is between the brakeshoe rails.

The broken lines in FIGURE 2 illustrate the positions of these parts when the pistons 22 are raised and prevented from moving downwardly and the wheel W of a moving car is between the brakeshoe rails 10 and 11. The wheel forces the brakeshoe rails 10 and 11 apart, since the space between the unspread brakeshoe rails is narrower than the wheel width. This causes the lever members 13 and 14 to pivot about their outer supporting portions 17 on the pistons 22, so that the running rail 1 lifts. The portion of the weight of the car carried by each wheel W between the brakeshoe rails 10 and 11 causes forces to be transmitted from the running rail 1 through hook bolts 18 to the supporting portions 17 of levers 13 and 14 carried by pistons 22, and thence to the brakeshoe rails 10 and 11, to cause a braking force to be applied to the car wheels by rails 10 and 11 that is proportional to the weight of the car. Variations normally encountered in the widths of conventional car wheels do not appreciably affect the amount of braking force applied, since the width of such a car wheel simply determines the amount that the running rail 1 lifts. Stabilizer means 8 prevents the running rail 1 from tipping and maintains the proper gauge of rails 1 and 2.

When the pistons 22 of the cylinder units 23 are permitted to move downwardly, the brakeshoe rails 10 and 11 separate by pivotal movement of the lever members 13 and 14 about their portions 16 bearing on plate 21, so that the braking force exerted by brakeshoe rails 10 and 11 is lessened or even completely eliminated.

The position of the pistons 22 is controlled by the speed sensing mechanism 6 through the agency of the control means 7.

The illustrated speed sensing mechanism 6, shown in FIGURES 3 to 6 inclusive, comprises a flexible laterally compressible hose 25, formed of reinforced weather and abrasion resistant synthetic rubber, plastic or other suitable material. The hose is resiliently and movably supported adjacent the running rail 2 opposite rail 1 carrying the braking means 5, so it can be engaged in rolling contact by the flanges of wheels of various widths having flanges of various depths normally encountered in railroad practice. The hose 25 extends from a location where it will be engaged by the wheels of a car traveling toward the retarder before the wheels pass between the brakeshoe rails 11 and 12 and extends for substantially the full length of rail 2 that is opposite brakeshoe rails 10 and 11. The beginning of hose 25 is sufficiently ahead of the beginning of rails 10 and 11 to permit these rails to be controlled by the apparatus when the car enters the retarder at maximum design entering speed. The supporting means shown for hose 25 comprises a metal supporting strip 26 of L-shaped cross section (FIGURES 5 and 6) located with one leg of the L at the lower edge of the strip and extending toward the inner side of the running rail 2 and the other leg of the L extending upwardly of the strip on the side of the tube away from the rail. Strip 26 is urged upwardly by compression-type coil springs 27 located between the bottom of strip 26 and the tops of base members 28 clamped to the lower flange 29 of the running rail 2. Strip 26 is anchored against more than small longitudinal movement relatively to the rail by link members 31 that are pivotally connected to upwardly extending lugs 32 fixed to base members 28 and to downwardly extending lugs 33 fixed to strip 26. Strip 26 also can move away from rail 2 sufficiently to accommodate the flanges of wheels that are wider or that move laterally on the rails, by being urged toward the rail 2 by spring members 34 fixed to base members 28. Vertical guide members 35 are mounted adjacent the rail 2 to aid in guiding the strip 26 vertically. The link members 31 are connected to lugs 32 and 33 sufficiently loosely to permit the requisite limited lateral movement of strip 26.

The illustrated retarder operates on cars traveling in the direction indicated by the arrows in FIGURES 1, 3 and 4. The end of tube 25 facing the direction from which the car normally approaches a retarder is connected through a conduit 36 (FIGURE 1) to a sump 37. The other end of the tube 25 is connected by a conduit 38 to the control valve mechanism 40 (FIGURES 1, 7, 8 and 9). Mechanism 40 is connected by two conduits 41 and 42 to sump 37 and by conduit 43 to the cylinder units 23 of the retarder.

Control valve mechanism 40 comprises body 44 made up of parts 45 and 46 held together by bolts 47. These parts define a chamber 48 divided by a flexible and preferably elastic diaphragm 49 the outer edges of which are clamped between parts 45 and 46. A plunger valve member 51 is fixed to the central portion of the diaphragm 49 in the part of the chamber 48 located in member 45, the diaphragm being biased toward member 45 by compression spring 52 located between diaphragm 49 and the end of chamber 48 in member 46. Conduit 39, communicating with the discharge end of tube 25, opens into the portion of chamber 48 containing valve plunger 51.

Part 45 of body 44 includes a cylinder bore 53 the outer end of which is closed by a threaded plug 54 and the inner end of which communicates through passages 55 and 56 with a port 57 having a valve seat 58 adapted to be contacted and closed by the plunger member 51 to seal port 57. Passage 56 permits liquid to pass from port 57 into cylinder 53, but not in the reverse direction, a closure ball 61 pressed by a spring 62 preventing this.

Cylinder bore 53 slidably carries a piston 63 that is biased toward the cylinder end opening into passages 55 and 56 by a spring 64 located in central bore 65 in piston 63 and seating in recess 66 in end plug 54. Spring 64 is selected to exert a force of predetermined magnitude for speed sensing purposes. Piston 63 has an external annular recess 67 located and formed to communicate at all times with a port 68 communicating with conduit 43 connected to cylinder units 23 of the braking mechanism; and, when the piston 63 is in the extreme position to which it is biased, with a port 69 communicating with conduit 41 connected to sump 37. The recess 67 on the exterior of the piston 63, and the port 69, is also so related that when the piston is in its extreme position nearest ports 55 and 56 (shown in FIGURE 7) the conduit 43 communicates directly with the sump 37 through port 68, piston recess 67, port 69 and conduit 41, whereas when the piston is in its other extreme position (shown in FIGURE 8) the piston closes port 69 and hence cuts off conduit 43 from the sump.

Body portion 45 also carries a threaded needle valve 71 adjustable by handle 72 relative to seat 73, to control the flow of fluid from plunger side of chamber 48 and to and through port 74 communicating with conduit 42 connected to sump 37.

As apparent from FIGURE 1, conduit 43 communicates with pipes 75 of cylinder units 22 through branch conduits 76 and 77 and intermediate conduits 78 and 79.

As apparent from FIGURE 2, each illustrated cylinder unit 23 comprises an external hollow piston 22 that is slidably mounted in sealing relation on an upwardly extending portion 81 fixed to the base 82 of the cylinder unit. This portion has a central bore 83 in which is located a compression-type spring 84 that biases the piston 22 upwardly to a position where it is held by stops 85 bearing against an outwardly extending radial flange 86 on the piston. The bore 83 communicates with the pipe 75 for the cylinder unit, which is connected to control valve mechanism 40 by conduit 43 as previously described.

The system is filled with suitable hydraulic fluid, such as oil of a suitable viscosity.

The operation of the illustrated apparatus is as follows, assuming that the pistons 22 of cylinders 23 are all in their raised positions as shown in FIGURE 2, that the parts of control valve mechanism are in the positions shown in FIGURE 7, and that a car is approaching on the track from the left in FIGURE 1 as shown by the arrows, at a speed above the actuating speed that will cause the car retarder to exert a braking force. This actuating speed is predetermined by the force exerted by spring 64 and by the adjustment of needle valve 71, which controls the amount of liquid that can be bled from chamber 48 above diaphragm 49 through port 69 and conduit 41 to sump 37. Under such circumstances, rolling contact of flanges of the wheels on rail 2 will develop in the liquid in hose 25 a pressure that is transmitted through conduit 39 to operate a diaphragm 49 in chamber 48 (FIGURE 7) to move valve 51 downwardly and open bore 57 to flow of liquid. The liquid under pressure then flows in hose 25, conduit 36, and through ports 55 and 56, acting on the end of piston 63 to move it to the right as shown in FIGURE 8. This closes off from sump 37 the liquid in conduit 43 and its branch conduits connected to cylinders 23, so that the pistons 22 are locked in their uppermost positions shown in FIGURE 2. Consequently, the braking mechanism 5 will exert on the car wheels between the brakeshoe rails 10 and 11 a braking force proportional to the weight of the car, which force as described above slows the car.

If the car has entered the retarder at a speed below the maximum design speed for which the retarder is designed and adjusted, the car will be slowed below the actuating speed before its wheels leave the brakeshoe rails 10 and 11; in such case the pressure of the liquid operating on the end of piston 63 is reduced so that the spring 64 can force the piston 63 back to its original position shown in FIGURE 7, thus opening the conduit 43 communicating with cylinders 23 so that the liquid can flow to the sump 37 from conduit 43 and the pistons 22 are no longer locked against downward movement by the trapped liquid. This releases brakeshoe rails 10 and 11 and removes all the braking force exerted by them on the car wheels, except a negligible amount resulting from brake cylinder biasing springs 84, so that the car can then move out of the retarder at the speed to which it has been slowed below the actuating speed.

As a second example, if the retarder pistons 22 are raised as shown in FIGURE 2 and the parts of the control valve mechanism 40 are located as shown in FIGURE 7, a car traveling in the direction of the arrows shown in FIGURE 1 at a speed below the actuating speed can move valve member 51 downward to open the passage 57 communicating with the piston 63. However, the pressure of the liquid is insufficient to move the piston 63 so it remains in the position shown in FIGURE 7 and permits the cylinder units 23 to communicate with the sump 37 through conduits 43 and 42. The car wheels then merely move the brakeshoe rails 10 and 11 apart against the forces exerted by piston biasing springs 84 and the car travels through the retarder without being slowed.

In any event, as the last car wheel moves off the sensing hose 25, the liquid pressure in conduit 36 caused by rolling of the wheel on hose 25 is eliminated; this permits biasing spring 52 to force valve member 51 upwardly to close passage 57 so that piston 63 is held where it was located when valve 51 closed; this, of course, affects the cylinder units 23 and the brakeshoe rails 10 and 11.

Thus, in the first example described above, the last car wheel will leave the sensing hose 25 while the piston 63 is positioned to close off communication between cylinder units 23 and the sump 37 so that the control mechanism parts will then be as shown in FIGURE 9 wherein the piston 63 is in its sealing position and the valve member 51 is in its sealing position. The pistons 22 of the cylinder units 23 are accordingly locked against downward movement beyond their locations at the time valve member 51 was closed, and the brakeshoe rails are prevented from spreading beyond the amount permitted by such piston locations.

In the second example above, the pressure developed by the slowly rolling wheels on the hose 25 is insufficient to move the piston 63, so even if valve member 51 opens, it merely closes again when the last wheel leaves the hose 25. The piston 63 is unaffected, as are pistons 22 of cylinder member 23.

In the event a car enters the retarder at a speed substantially higher than the maximum entering speed for which the retarder was designed, the liquid pressure developed in hose 25 will cause valve member 51 to open and the piston 63 to move to the position shown in FIGURE 8 which locks the pistons 22 and the brakeshoe rails 10 and 11 in positions to cause wheels traveling on rail 2 through the retarder to be subjected to a braking force proportional to the car weight as described above. In this case, however, the car wheels will leave the retarder at a velocity above the actuating speed so that when the last wheel leaves the hose 25 the valve member 51 closes and locks the piston 63 in the position shown in FIGURE 9, while the pistons 22 are elevated and the brakeshoe rails 10 and 11 are in braking position.

Regardless of the positions in which the parts are left by preceding car leaving the retarder, the succeeding car approaching the retarder will cause the retarder to operate. The first car wheels moving on the hose 25 will cause the development of a pressure which will first open valve member 51 and subject the piston 63 to the pressure. If the pressure results from travel of the car above the actuating speed, the piston 63 will be moved to the position shown in FIGURE 8 if it is not already there; if the pressure is less because the car is traveling slower than actuating speed, the piston 63 will move to the position shown in FIGURE 7 if it is not already there. The pistons 22 of cylinder units 23, and the brakeshoe rails 10 and 11 will be accordingly controlled.

Whenever the cylinder units 23 communicate into the sump due to location of the pistons 63 as shown in FIGURES 8 and 9, and the pistons 22 are raised by their springs 84, liquid is drawn from the sump into the cylinders by the pistons. Since the system including hose 25 is filled with liquid and the volume of liquid in the hose is decreased only slightly when the hose is contacted by the flanges of the wheels, the hose is filled at all times with liquid since any liquid forced from the hose is drawn back into the hose when its resiliency causes it to resume its normal shape, the hose being so designed. Springs 84 are designed to exert upward forces sufficient to raise the pistons 22 to their uppermost positions against the weight of the outer ends of levers 13 and 14 and the forces resulting from fluid flow or frictional resistance.

It is apparent that the distance in advance of the brakeshoe rails that the car wheels first contact the hose 25 should be selected so that at the maximum car entering speed for which the retarder is designed the time available for development of pressure in hose 25 and transmission of the pressure to the various conduits will be sufficient to cause the desired results. The length of the hose relative to the brakeshoe rails 10 and 11 and the length of these rails also affect the operation of the apparatus and the degree to which the car is slowed, these lengths being readily determinable. For a given design, the actuating speed also can be accurately predetermined within limits by adjustment of handle 72 on needle valve 71 which controls the amount of liquid that bleeds into the sump rather than acting on the piston 63.

Those skilled in the art will appreciate that various changes and modifications can be made in the disclosed embodiment of the invention without departing from the spirit and scope thereof. The essential characteristics of the invention are described in the appended claims.

I claim:

1. In combination, a stretch of railway comprising a running rail, brakeshoe means associated with a running rail, said brakeshoe means being operable to be maintained in braking relation in which said brakeshoe means can exert on a car wheel on said running rail a braking force and to be released so said brakeshoe means cannot exert appreciable braking force, means for sensing the speed of a car traveling along said stretch of railway, said speed-sensing means comprising movable wheel-contacting means located adjacent a running rail and adapted to be rollingly contacted and moved independently of the rail by a portion of a car wheel rolling on said rail that is free of contact with said rail, said speed-sensing means operating to produce an output control signal that has a characteristic related to the speed of said car wheel traveling on said rail and contacting said wheel-contacting means, and means controlled by said speed sensing means for maintaining said brakeshoe means in braking relation when said car is traveling faster than a predetermined speed and for releasing said brakeshoe means when said car is traveling slower than said predetermined speed.

2. The combination of claim 1 in which said running rail adjacent which said wheel-contacting means is located is adapted to have a flanged wheel roll thereon, and in which said wheel-contacting means is adapted to be contacted by the flange of said flanged wheel.

3. In combination, a stretch of railway comprising a running rail, brakeshoe means associated with a running rail, said brakeshoe means being operable to be maintained in braking relation in which said brakeshoe means can exert on a car wheel on said running rail a braking force substantially proportional to the downward force exerted by the wheel on the running rail and resulting from the weight of the car carried by said wheel, means for sensing the speed of a car traveling along said stretch of railway, said speed-sensing means comprising movable wheel-contacting means located adjacent a running rail and adapted to be rollingly contacted and moved independently of the rail by a portion of a car wheel rolling on said rail that is free of contact with said rail, said speed-sensing means operating to produce an output control signal that has a characteristic related to the speed of said car wheel traveling on said rail and contacting said wheel-contacting means, and means controlled by said speed sensing means for maintaining said brakeshoe means in braking relation when said car is traveling faster than a predetermined speed and for releasing said brakeshoe means when said car is traveling slower than said predetermined speed.

4. The combination of claim 3 in which said running rail adjacent which said wheel-contacting means is located is adapted to have a flanged wheel roll thereon, and in which said wheel-contacting means is adapted to be contacted by the flange of said flanged wheel.

5. In combination with a stretch of railway, a car retarder comprising a portion of a running rail, brakeshoe means associated with said running rail portion, a brake-actuating lever supporting said brakeshoe means, said lever being disposed transversely to said running rail portion and being supported at a bearing portion of said lever spaced transversely from said running rail portion, means movably supporting said bearing portion of said lever, said means being movable between raised and lowered positions, control means for selectively preventing downward movement of said supporting means to locate its height, and speed sensing means that senses the speed of a car approaching said car retarder and is operatively associated with said control means to cause, when the car approaches said retarder at a higher speed than a predetermined speed, said movable supporting means to be maintained in a raised position in which it supports said bearing portion of said associated lever in an elevated position so that when a car wheel travels on said running rail portion said brakeshoe member exerts on said car wheel a braking force, and to cause when a car approaches said retarder at a lower speed than said predetermined speed said movable supporting means to be in a lower position in which it supports said bearing portion of said lever in a lower position so that when a car wheel travels on said running rail portion said brakeshoe member exerts substantially no braking force on said car wheel, said speed-sensing means comprising movable wheel-contacting means located adjacent a running rail in said stretch of railway and adapted to be rollingly contacted and moved independently of said rail by a portion of a car wheel rolling on said rail that is free of contact with said rail, said speed-sensing means operating to produce an output control signal that has a characteristic related to the speed of the car wheel traveling on said rail and contacting said wheel-contacting means so that said output control signal can control said control means.

6. In combination with a stretch of railway, a car retarder comprising a running rail, oppositely disposed levers disposed transversely to said running rail and being supported by bearing portions of said levers spaced from said running rail, means movably supporting said bearing portions of said levers, said means being movable between braking and released positions, oppositely disposed elongated brakeshoe members secured to said respective levers along both sides of said running rail, control means for selectively maintaining said movable supporting means in braking position and for releasing said movable means, and speed sensing means that senses the speed of a car approaching said car retarder and is operatively associated with said control means to cause, when the car approaches said retarder at a higher speed than a predetermined speed, said movable supporting means to be maintained in its braking position in which it supports said bearing portions of said brakeshoe members so that when a car wheel travels on said running rail portion said brakeshoe members exert on said car wheel a braking force, and to cause when a car approaches said retarder at a lower speed than said predetermined speed said movable supporting means to be released so that when a car wheel travels on said running rail portion when said brakeshoe member exerts substantially no braking force on said car wheel, said speed-sensing means comprising movable wheel-contacting means located adjacent a running rail in said stretch of railway and adapted to be rollingly contacted and moved independently of said rail by a portion of a car wheel rolling on said rail that is free of contact with said rail, said speed-sensing means operating to produce an output control signal that has a characteristic related to the speed of the car wheel traveling on said rail and contacting said wheel-contacting means so that said output control signal can control said control means.

7. In combination with a stretch of railway, a car retarder comprising a running rail, oppositely disposed levers supporting a portion of said running rail, said levers being fixed and disposed transversely to said running rail portion and being supported at bearing portions of said levers below said running rail and at bearing portions of said levers spaced from said running rail, means movably supporting the spaced bearing portion of a lever, said means being movable between raised and lowered positions, oppositely disposed elongated brakeshoe members secured to said levers along both sides of said running rail, control means for selectively preventing downward movement of said movable supporting means to locate its height, and speed sensing means that sense the speed of a car approaching said car retarder and is operatively associated with said control means to cause, when the car approaches said retarder at a higher speed than a predetermined speed, said movable supporting means to be maintained in a raised position in which it supports the spaced bearing portion of its associated lever so that when a car wheel travels on said running rail portion the brakeshoe member fixed to said lever exerts on said car wheel a braking force substantially proportional to the downward force exerted by said wheel on said running rail from the weight of the car, and to cause, when a car approaches said retarder at a speed lower than said predetermined speed, said movable supporting means to be in a lower position in which it supports the spaced bearing portion of its associated lever so that when a car wheel passes over said running rail portion the brakeshoe member fixed to said lever exerts substantially no braking force on said car wheel, said speed-sensing means comprising movable wheel-contacting means located adjacent a running rail in said stretch of railway and adapted to be rollingly contacted and moved independently of said rail by a portion of a car wheel rolling on said rail that is free of contact with said rail, said speed-sensing means operating to produce an output control signal that has a characteristic related to the speed of the car wheel traveling on said rail and contacting said wheel-contacting means so that said output control signal can control said control means.

8. In combination, a stretch of railway having a pair of running rails; brakeshoe means associated with the first of said running rails; means for movably supporting said brakeshoe means from a braking position in which the brakeshoe means can exert on a wheel on said first running rail a braking force to a release position in which said brakeshoe means does not exert an appreciable braking force, said means being operable by fluid to be locked in braking position when escape of fluid therefrom is blocked; speed sensing means associated with the second of said running rails for sensing the speed of a wheel traveling on said second running rail, said speed sensing means comprising a resiliently compressible fluid-containing hose member positioned adjacent said second running rail and adapted to be engaged in rolling contact by a wheel on said second running rail to compress said hose member laterally thereof and develop in fluid in said hose member a pressure related to the speed of said wheel in rolling contact with said hose member; and means controlled by said speed sensing means for blocking escape of fluid from said movable supporting means for said brakeshoe means to lock said brakeshoe means in braking position when said wheel is traveling faster than a predetermined speed and for permitting escape of fluid from said movable supporting means for said brakeshoe means to permit said brakeshoe means to assume a release position when said wheel is traveling at a speed slower than said predetermined speed.

9. In combination, a stretch of railway having a pair of running rails; brakeshoe means associated with the first of said running rails; means for movably supporting said brakeshoe means from a braking position in which the brakeshoe means can exert on a wheel on said first running rail a braking force to a release position in which said brakeshoe means does not exert an appreciable braking force, said means being operable by fluid to be locked in braking position when escape of fluid therefrom is blocked; speed sensing means associated with the second of said running rails for sensing the speed of a wheel traveling on said second running rail, said speed sensing means comprising a resiliently compressible fluid-containing hose member positioned adjacent said second running rail and adapted to be engaged in rolling contact by a wheel on said second running rail to compress said hose member laterally thereof and develop in fluid in said hose member a pressure related to the speed of said wheel in rolling contact with said hose member; and means controlled by said speed sensing means for locking said movable supporting means for said brakeshoe means in braking position when said wheel is traveling faster than a predetermined speed and for releasing said movable supporting means for said brakeshoe means to a release position when said wheel is traveling at a speed slower than said predetermined speed, said means including a body having a cylinder bore in which a piston is movably mounted, passages in said body communicating with said bore and adapted to be put in communication with each other when said piston is in one location in said bore and to be closed one from the other when said piston is in another location in said bore, one of said passages communicating with a source of fluid and the other with said means for movably supporting said brakeshoe means, said piston being biased toward one end of said cylinder to said location permitting communication between said passages, the portion of said cylinder bore toward which said piston is biased being in communication with said hose member, whereby fluid in said hose member at a pressure developed by a wheel in rolling engagement with said hose member traveling at a speed above said predetermined speed moves said piston to a location where it interrupts communication between said passages and blocks escape of fluid from said movable brakeshoe supporting means to lock it in braking position.

10. Apparatus for sensing the speed of a wheel moving along a rail, comprising a rail adapted to have a wheel roll thereon, a resiliently compressible fluid-filled hose member positioned adjacent said rail and supported to be engaged in rolling contact by a wheel on said rail to compress said hose member laterally thereof and develop in fluid in said hose member a pressure proportional to the speed of the wheel, and means actuated by a predetermined pressure of fluid in said hose member.

11. Apparatus for sensing the speed of a wheel moving along a rail, comprising a rail adapted to have a wheel roll thereon, a resiliently compressible fluid-filled hose member positioned adjacent said rail and adapted to be engaged in rolling contact by a wheel on said rail to compress said hose member laterally thereof and develop in fluid in said hose member a pressure proportional to the speed of the wheel in rolling contact with said hose member; and valve means actuated by a predetermined pressure of fluid in said hose member, said valve means comprising a body having a cylinder bore in which a piston is movably mounted, passages in said body communicating with said bore and adapted to be put in communication with each other when said piston is in one location in said bore and to be closed one from the other when said piston is in another location in said bore, one of said passages communicating with a source of fluid and the other with an outlet for said fluid, said piston being biased toward one end of said cylinder to said location permitting communication between said passages, the portion of said cylinder bore toward which said piston is biased being in communication with said hose member, whereby fluid in said hose member at a pressure developed by a car wheel in rolling engagement with said hose member traveling at a speed above a predetermined speed moves said piston to a location where it interrupts communication between said passages.

12. In combination, a stretch of railway comprising a running rail, brake shoe means associated with a running rail and operable to be maintained in and released from braking relation to said running rail in which relation said brakeshoe means can exert a braking force on a wheel rolling on said running rail; speed-sensing means associated with a running rail for sensing the speed of a wheel traveling on said running rail, said speed-sensing means comprising resiliently compressible fluid-containing hose means positioned adjacent said running rail and adapted to be engaged in rolling contact by said wheel on said running rail to compress said hose means laterally thereof and develop in fluid in said hose means a pressure related to the speed of said wheel in rolling contact with said hose means; and means controlled by the pressure of fluid in said hose means for maintaining said brakeshoe means in said braking relation when the wheel is traveling faster than a predetermined speed and for releasing said brakeshoe means when the wheel is traveling slower than said predetermined speed.

13. In combination, a strip of railway comprising a running rail, brake shoe means associated with a running rail and operable to be maintained in and released from braking relation to said running rail in which relation said brakeshoe means can exert a braking force on a wheel rolling on said running rail; speed-sensing means associated with a running rail for sensing the speed of a wheel traveling on said running rail, said speed-sensing means comprising resiliently compressible fluid-containing hose means positioned adjacent said running rail and adapted to be engaged in rolling contact by said wheel on said running rail to compress said hose means laterally thereof and develop in fluid in said hose means a pressure related to the speed of said wheel in rolling contact with said hose means; and means controlled by said speed-sensing means for maintaining said brakeshoe means in braking relation when said wheel is traveling faster than a predetermined speed and for releasing said brakeshoe means from braking relation when said wheel is traveling at a speed slower than said predetermined speed, said means including a body having a cylinder bore in which a piston is movably mounted, passages in said body communicating with said bore and adapted to be put in communication with each other when said piston is in one position in said bore and to be closed one from the other when said piston is in another location in said bore, one of said passages communicating with a source of fluid and the other with means for maintaining said brakeshoe means in braking relation, said piston being biased toward one end of said cylinder to said location permitting communication between said passages, the portion of said cylinder bore toward which said piston is biased being in communication with said hose means, whereby fluid in said hose means at a pressure developed by a wheel in rolling engagement with said hose means traveling at a speed above said predetermined speed moves said piston to a location where it interrupts communication between said passages to cause said brakeshoe means to be maintained in braking relation.

References Cited

UNITED STATES PATENTS

| | | | |
|---|---|---|---|
| 3,200,245 | 8/1965 | Brown | 188—62 X |
| 3,209,865 | 10/1965 | Wynn | 188—62 |
| 3,237,007 | 2/1966 | Crawford | 246—182 |
| 3,240,930 | 3/1966 | Porter et al. | 246—182 |

DUANE A. REGER, *Primary Examiner.*